Nov. 24, 1925.                                                        1,562,863
W. BROADBRIDGE ET AL
PURIFICATION OR EXTRACTION OF SOLUBLE SUBSTANCES
Filed June 13, 1922
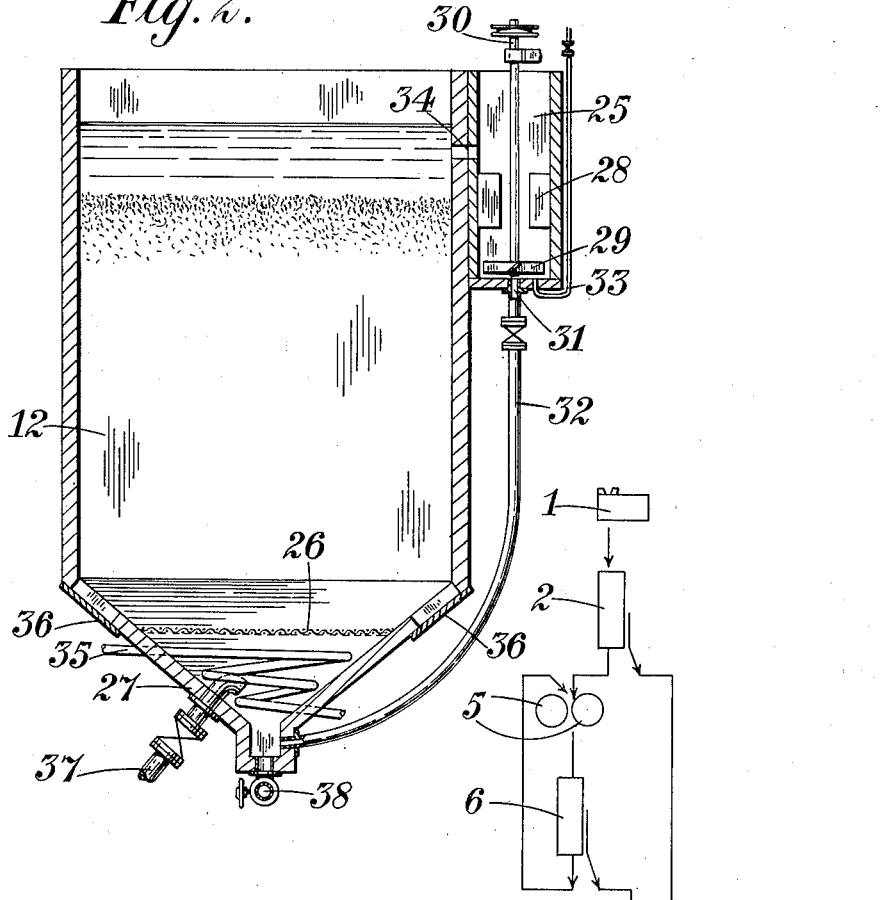
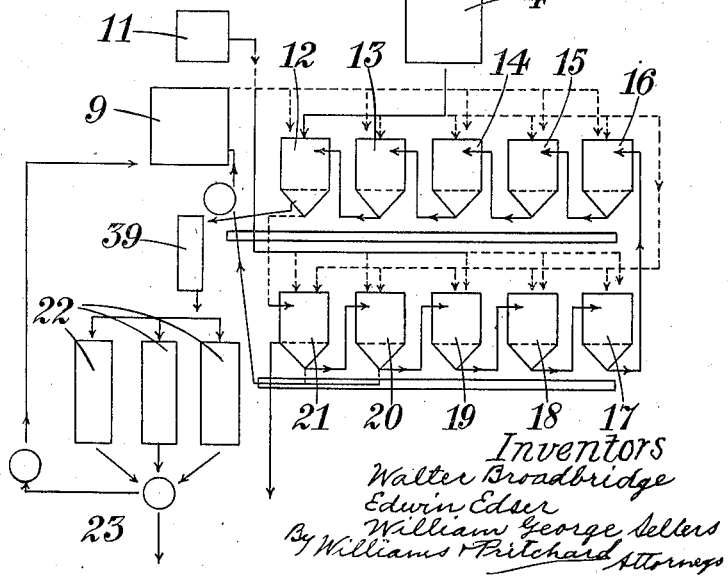

Patented Nov. 24, 1925.

1,562,863

UNITED STATES PATENT OFFICE.

WALTER BROADBRIDGE, EDWIN EDSER, AND WILLIAM GEORGE SELLERS, OF LONDON, ENGLAND, ASSIGNORS TO MINERALS SEPARATION NORTH AMERICAN CORPORATION, OF NEW YORK, N. Y.

PURIFICATION OR EXTRACTION OF SOLUBLE SUBSTANCES.

Application filed June 13, 1922. Serial No. 568,047.

*To all whom it may concern:*

Be it known that we, WALTER BROADBRIDGE, EDWIN EDSER, and WILLIAM GEORGE SELLERS, all residing in London, England, British subjects, have invented certain new and useful Improvements in the Purification or Extraction of Soluble Substances, of which the following is a specification.

This invention consists in improvements in or relating to the purification or extraction of soluble substances from a mixture with insoluble finely divided impurities, or from contamination with such impurities. The invention has been primarily devised for application to the treatment of "caliche", the crude material from which sodium nitrate is extracted, but the invention is also applicable to the extraction from crude natural deposits of other soluble substances. The process is carried out with a hot solvent in the case of such substances as caliche the characteristic of which is that they are largely soluble in hot liquor and can be crystallized out of solution by cooling. For example, borax may be extracted in this manner.

In the existing process of treating caliche it is crushed and the water-soluble constituents are dissolved out by hot water, and the solution is concentrated, decanted from the undissolved matter, and allowed to cool, whereupon the crude sodium nitrate crystallizes out. In the existing process the percentage of recovery is very poor, one reason being that if the caliche be crushed only into large lumps (one or two inches in diameter), as is customary, the extraction (dissolving of sodium nitrate) is only partial, while if the crushing is carried much further, slimes are produced which will not readily settle and cannot be economically removed by filtration.

Broadly speaking, we propose to employ a process in which the crude material is crushed to such a degree as to ensure effective extraction of the soluble substance by the solvent liquor, and in which special steps are taken to prevent the slimes from remaining in suspension in the solvent liquor.

We have discovered that where any strong solution of a soluble substance such as sodium nitrate containing slimes in suspension is agitated (preferably with aeration) in the presence of a flocculating agent the slimes tend to become flocculated, and in this condition they are deposited readily on a filter bed; for example they are deposited readily on the undissolved residues of caliche as the solution percolates through a bed of caliche.

The invention comprises a process of purifying a soluble substance contaminated with insoluble finely divided impurities which consists in treating the contaminated mixture with a solvent to dissolve the soluble substance and produce a contaminated solution, subjecting the contaminated solution to agitation in the presence of a flocculating agent to flocculate the insoluble finely divided impurities, separating the solution from the flocculated impurities, and recovering the desired substance from the purified solution.

This invention also comprises a method for the extraction of soluble substances such as sodium nitrate from crude material such as caliche in which during the leaching operation, solvent liquor is brought into contact with the crushed material and is mixed (preferably by agitation and aeration) with a reagent which causes the finely divided particles in suspension to cohere into small flocculated masses which are forthwith removed from the liquor by passing it through a filter-bed.

The invention further comprises a leaching process for the extraction of soluble salts from caliche or the like characterized by (a) the cyclical percolation of the charge of the suitably crushed caliche by an aqueous liquor in a downward direction, (b) the passage of the effluent from the bottom of the caliche charge through a vessel wherein flocculation of the fine earthy suspensions or slime is effected, (c) the return of the liquor and flocculated slime on to the top of the charge, (d) the deposition of the flocculated slime upon the insoluble portions of the charge, and (e) the continuance of this cyclical procedure until the desired limit of extraction of soluble salts from the caliche has been attained or until the solvent has become saturated therewith, and the final effluent is free from slime.

Preferably, the caliche or other crude material before extraction is crushed to pass through a screen having an aperture of about half-an-inch, or to such size that substantially all the nitrate can be extracted therefrom.

If desired, the crushed material, before extraction, may be so treated as to separate the fines from the coarser particles, and the two products may be separately treated for extraction of the soluble salts therefrom, the fines being treated by the agitation process hereinafter described.

With poor caliche, efficient extraction may depend on a very complete displacement of the solution from the caliche residues, and the solution of sodium nitrate resulting from the extraction, and before crystallization, may be subjected to evaporation, so that the amount of wash water in excess of (a) the water carried by the extracted material, (b) the water evaporated during extraction, and (c) the moisture removed in the finished nitrate, may be eliminated from the circuit.

Suitable apparatus for carrying out a process embodying this invention contains a series of units, each comprising the combination with an upright extraction vessel of a false bottom on which the crushed caliche rests, a bottom preferably tapered below the false bottom, an agitation vessel containing a rotary impeller and having upright flat walls or baffles to ensure efficient agitation and aeration of the liquor, a conduit leading from the bottom of the extraction vessel to the agitation vessel at the suction zone of the impeller, and an overflow or like conduit leading from the agitation vessel back to the upper part of the extraction vessel.

In the accompanying drawings—

Figure 1 is a diagram or "flow-sheet" indicating by way of example one general arrangement of plant suitable for carrying out this invention, and Figure 2 is a vertical sectional view of one form of extraction unit according to this invention.

Example I.

The following is a description, by way of example, of one method of carrying this invention into effect, in the case in which the fine and coarse material are treated together. The crude caliche is first crushed to pass an aperture of about half-an-inch square. The crushing may conveniently be done by passing the crude caliche through a breaker 1 to reduce it to lumps, one or two inches in diameter. This material may be passed through a trommel 2 of half-an-inch aperture, the oversize being passed through rolls 5 for further crushing, the product from the rolls also being passed through a trommel 6 of one-half-inch aperture. Material screened through the trommels is collected in a storage bin 4 of crushed caliche.

In the process according to this invention, as in the process at present in use (the Humberstone process), the solvent liquor is used cyclically. The crushed caliche is introduced into tanks 12—21 provided with false bottoms and steam-heating coils, and the solvent liquor is passed from a store tank 9 first into the tank (say 19) containing the most completely exhausted caliche, and the liquor is afterwards transferred from tank to tank, until it is finally passed through the tank (say 12) containing the fresh caliche, after which the strong liquor is subjected to crystallization in vessels 22, the crystals of sodium nitrate being separated by a centrifugal or vacuum separator 23, and the cold liquor is returned for re-use to the store tank 9. Wash water from a separate tank 11 is employed for finally displacing the liquor from the fully exhausted caliche.

In the present arrangement, each extraction unit comprises two parts see Figure 2, the extraction unit comprises two parts see Figure 2, the extraction tank (12 for example) and the agitation vessel 25. The extraction tank 12 is a large upright tank, conveniently square in horizontal section. It has a false bottom 26, on which the crushed caliche rests, and below the false bottom is a tapering (conveniently pyramidal) bottom 27 down to which the solution passes. At the side of the tank, conveniently near the top, is a small agitation vessel 25 which is conveniently an upright rectangular box, and may be provided with vertical baffles 28. Near the bottom of the agitation vessel 25 is a horizontal impeller 29 driven by a vertical rotatable spindle 30. The inlet 31 to the agitator is near the suction zone of the impeller 29, conveniently at the centre of the bottom of the agitation vessel 25, and to this inlet a conduit 32 leads from the tapered bottom 27 of the extraction tank 12. There is also an inlet 33 for air at the bottom of the agitation vessel 25 (also conveniently in the suction zone of the impeller). The outlet 34 from the agitation vessel leads directly into the top of the extraction tank 12. The agitation vessel 25 may be replaced by a centrifugal pump preferably provided with an air inlet leading to its suction zone.

The caliche may fill the extraction tank 12 for a considerable proportion of its height, and the level of the solvent liquor is above the top of the caliche. Steam coils 35 are utilized for heating the solvent liquor, and these may conveniently be placed below the false bottom 26. The false bottom may be covered with a 10-mesh screen.

In the lower part of the tank 12, above the false bottom, doors 36 are provided for removal of the caliche residues, and below the false bottom an outlet 37, controlled by a tap, is provided for the strong liquor, and there is also an outlet 38, controlled by a tap, provided below the false bottom to discharge the liquor from one vessel into another.

The tapered bottom 27 should preferably have an angle sufficiently steep to prevent accumulation of fine particles of caliche thereon.

The pipe 32 should be of a such a diameter that when the liquid is flowing up through it any fine solid particles present in the liquid will not settle in the pipe but will be carried into the vessel 25.

The liquor that has just passed downwards through the caliche in any tank, together with any fines or slimes which may be suspended therein, are drawn by means of the impeller 29 into the agitation vessel 25 and are circulated back through the bed of caliche. During their passage through the agitation vessel 25, the slimes are flocculated by the agitation and aeration, and to assist flocculation there may be added a very small proportion of a flocculating agent, such as an oil, as hereinafter described. When the flocculated slime returns to the bed of caliche it is very readily deposited on the solid residuum of the caliche. In the present process it is arranged that the solvent liquor shall circulate several times through any tank before it is discharged into another tank, thus securing efficient extraction of the nitrates from the caliche in that tank.

The slimes or a portion thereof may float to the surface of the liquor as a froth, but in any case clear nitrate liquor finally results. The consumption of oil or other flocculating agent is small and generally need not exceed 1.5 lbs. per ton of finished nitrate in continuous operation. Successful flocculation has been obtained by adding equal parts of oleic acid and wood tar. The proportion of solid to liquid in the tank may be approximately 1:1 by weight, or, more correctly, 10 lbs. of caliche to every gallon of return liquor of 1.35 sp. gr.

For continuous operation a number of tanks (12 to 21) may be provided. Caliche (preferably preheated in a jacketed hopper to a temperature somewhat above 100° C.) is fed to an empty tank (say No. 12) and hot liquor that has been previously nearly saturated with nitrate is allowed to flow in from tank No. 13. This flow should occur from the bottom of tank No. 13 to the bottom of tank No. 12 by way of a pipe joining the valve 37 of tank No. 13 to the valve 38 of tank No. 12 (Figure 2). A passage of less saturated liquor takes place simultaneously from the bottom of tank No. 14 to the top of tank No. 12 and so on to tank No. 19, which is kept full by means of return liquor from the evaporation plant, previously pumped to a head tank 11. After the tanks have been filled as described, circulatory percolation of the liquor downwards through the caliche bed proceeds in each tank until the hot liquor (at a temperature of 110° C. say) in tank No. 12 is sufficiently saturated to yield nitrates of commercial purity. On an average the liquor may be circulated 3, 4 or more times through the bed of caliche in each tank, which operation may occupy two hours.

The saturated liquor in tank No. 12 is then run out into the crystallizing tank, and subsequently No. 12 is filled from No. 13, while No. 13 is kept full by liquor from No. 14, and so on, to No. 18, which is filled from No. 19 while No. 19 is kept full by heated water from tank 11.

Another tank, say No. 21 filled with fresh caliche, is now brought into use and filled from tank No. 12 and tank No. 19 is disconnected from the circuit so that the tank which was the first becomes the second, and so on throughout the series, and the cycle of operations described above recommences.

The fully extracted residues in No. 19 are washed and drained, and are thereafter discharged. The drainage liquor is pumped into the head tank 9 for the return liquor and serves to replace the water lost during the cycle.

In the existing method of nitrate extraction it is customary to heat the liquor in the extraction vessels to boiling point: in fact a considerable concentration of the liquor by evaporation is a feature of that known process. In the process according to the present invention a substantially complete extraction can be obtained without heating the circuit liquor above 110° C., and the losses due to evaporation are minimized.

As explained above, there are three ways in which the amount of water in the circuit is diminished, viz, water is carried away with the discharged residues, water is carried away with the crystallized nitrate, and a very small amount of water may be lost by evaporation during the extraction. We have found by investigation that with caliche of low grade it is only possible to secure efficient extraction if the solvent liquor is effectively displaced from the residues before discharge. The most satisfactory way of performing this is to allow the relatively light wash water from tank 11 to flow on to the surface of the stronger liquor (about 1.35 sp. gr.) while the whole subsides very slowly through the bed of caliche.

If the amount of wash water added exceeds the amount of water removed from the circuit by the different ways above referred to, it is necessary to bring the circuit liquor back to its normal quantity, and this can effectively be done by evaporation of the strong liquor in an evaporator 39 immediately before crystallization of the sodium nitrate.

During extraction and circulation, the liquors will be maintained at temperatures increasing from about 30° C. in the tank containing the exhausted caliche, to about 110° C. in the tank containing the liquor ready for crystallization, and boiling of the liquor should not be produced in any of the tanks.

Example II.

The following is a description of another method of carrying this invention into effect in the case in which the fine and coarse material are treated separately. The crude dry caliche is first crushed to pass an aperture of about half-an-inch square, as described in the previous example. The crushed caliche is then passed through a trommel, having an aperture of one-tenth of an inch, and by this means the fines are separated from the coarser particles. The quantity of return liquor which is to be used for the treatment of the whole batch (fines and coarse) is first used for the extraction of the sodium nitrate from the fines. This extraction is carried out in any suitable form of mixing tank provided with means of agitation and a heating device; it may, for example, be done in a Pachuca tank, or other form of mixer. By this means the sodium nitrate is dissolved with substantial completeness from the fines. The pulp is then preferably introduced into a classifier by means of which those sands which will settle are separated therefrom, whereupon they are filtered and washed, the wash water being sent to the return liquor head tank 9. The mother liquor from the classifier contains a large proportion of finely divided material in suspension. This liquor is introduced into an agitation and aeration apparatus of any of the well-known types employed in the froth-flotation process of concentrating ores; for example, it may be introduced into a series of square upright vessels provided with horizontal rotary impellers, and preferably with an inlet for air at the bottom. In this apparatus the liquor is subjected to agitation and aeration with the addition of a suitable small quantity of a flocculating and frothing agent; for example, there may be added about 10 lbs. per ton of dry slimes, of an oil or mixture of oils, such as a mixture of oleic acid and wood tar. The bulk of the slimes are removed from the liquor in the form of a floating froth, which may be washed and then discharged to waste. Any slimes remaining in the liquor unfloated, are thoroughly flocculated by the agitation and aeration process.

The treatment of the coarser particles is carried out by the process already described for the treatment of the whole crushed caliche, and it is found that the liquor containing the flocculated slimes deposits these slimes on the bed of caliche in the extraction tanks as already described.

The term "caliche" has been used throughout this specification as indicating the raw material containing sodium nitrate, and it will be understood that that term includes the various products, such as costra, ripic, etc., which contain recoverable nitrate.

In this specification the expression "flocculating agent" has been used. It is not possible to state in advance all the substances which may successfully be used as flocculating agents. Fatty acids, such as oleic acid, triglyceride oils and fats, wood tar, glue, starch, soap, also calcium oleate, sodium silicate and sodium aluminate are all effective as flocculating agents.

A simple preliminary test with any given substance is sufficient to determine whether, on agitation and aeration with the caliche pulp, it brings about effective flocculation of the slime particles and at each particular district where this invention may be put into application it may be found possible to utilize some local oil or like product for the purpose of assisting flocculation if necessary.

Such a test may be carried out as follows:—

A pulp of caliche in normal hot circuit liquor is prepared, containing an amount of slime approximately equal to that to be expected in practice. This pulp is made by mixing finely ground caliche with hot circuit liquor and stirring it intermittently for several hours since the amount of caliche slime formed and the stability of the suspension depends partly on the time of contact.

A test machine similar to Figure 2 is made in a cylindrical form 8 inches in diameter and 12 inches high, the agitation box being 4 inches square and 9 inches high. The test vessel is provided with a false bottom, as in Figure 2, but no heating coils are required. The test vessel is packed with caliche ground to the size that will be used in the plant, and the liquor containing the slimes is poured in through the agitation box, so as to flow upwards through the caliche until the vessel is full. The liquor in the vessel can be kept hot by applying a flame to the lower conical surface of the test vessel. The propeller is then rotated so as to produce circulation of the liquid, and the material whose flocculating capacity is to be tested is added; a small quantity at a time, to the liquid in the agitation box. The rate at which the liquor clears can be observed and thus the flocculating capacity of the substance added is tested. It will be found in general that the amount of flocculating agent, expressed as pounds per ton of the material treated in the testing apparatus, will be somewhat in excess of the amount required in large scale operations.

The flocculation to be produced according to this invention need not necessarily result in a settlement of the slimes, what is required being that, as the liquor passes through the bed of caliche, the flocculated slime material shall be deposited thereon, permitting the liquor to emerge clear. The flocculated slime material may likewise be removed from the liquor by passing the liquor through some other filter-bed such as a body of coke.

The invention may also be applied to the extraction of sodium chloride and other naturally occurring soluble salts.

What we claim as our invention and desire to secure by Letters Patent is:—

1. The process of purifying a soluble substance contaminated with insoluble finely divided impurities, which consists in treating the contaminated substance with a solvent to dissolve the soluble substance and produce a contaminated solution, agitating the contaminated solution with a small proportion of a flocculating agent to flocculate the impurities, filtering the solution to separate it from the flocculated impurities, and recovering the substance from the filtered solution.

2. The process of purifying a soluble substance contaminated with insoluble impurities including finely divided impurities which consists in passing a solvent through a layer of the contaminated substance to dissolve the soluble substance leaving behind a layer of impurities and producing a solution contaminated with finely divided impurities, agitating the contaminated solution with a small proportion of a flocculating agent to flocculate the finely divided impurities, and filtering the solution carrying the flocculated impurities through a layer of impurities from which such soluble substance has been dissolved out, and recovering the substance from the filtered solution.

3. The process of purifying a soluble salt contaminated with insoluble finely divided impurities, which consists in treating the contaminated salt with water to dissolve the soluble substance and produce a contaminated solution, agitating the contaminated solution with a small proportion of a flocculating agent to flocculate the impurities, filtering the solution to separate it from the impurities, and recovering the salt from the filtered solution.

4. The process of purifying a soluble salt contaminated with insoluble impurities including finely divided impurities which consists in passing water through a layer of the contaminated salt to dissolve the soluble salt leaving behind a layer of impurities and producing a solution contaminated with finely divided impurities, agitating the contaminated solution with a small proportion of a flocculating agent to flocculate the finely divided impurities, filtering the solution carrying the flocculated impurities through a layer of impurities, and recovering the salt from the filtered solution.

In testimony whereof we have signed our names to this specification.

WALTER BROADBRIDGE.
EDWIN EDSER.
WILLIAM GEORGE SELLERS.